July 18, 1944.    W. O. RUNCIE    2,354,145
LENS CAPPING MECHANISM
Filed Aug. 16, 1941
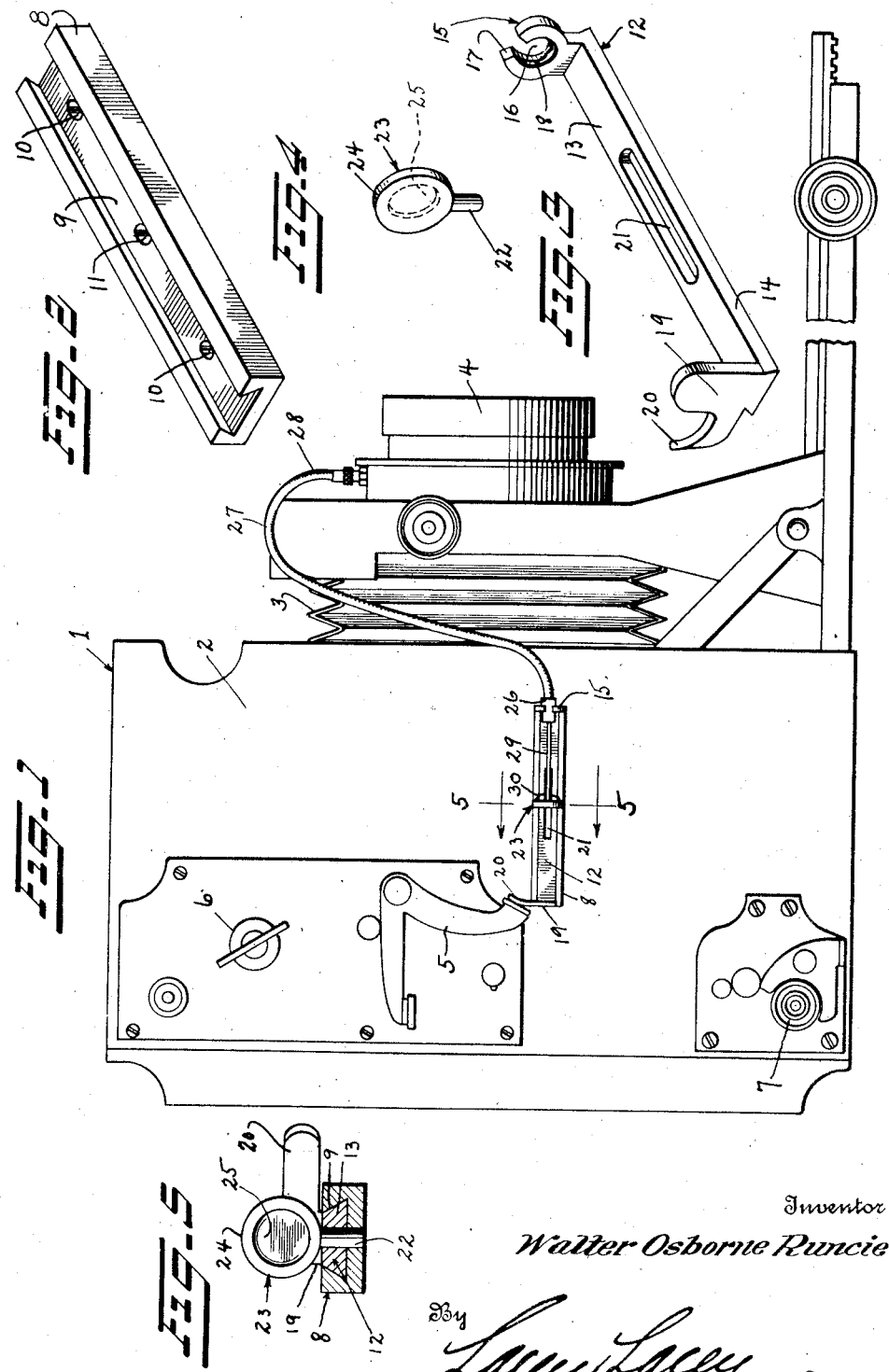
Inventor
Walter Osborne Runcie
By Lacey & Lacey, Attorneys Patented July 18, 1944

2,354,145

UNITED STATES PATENT OFFICE 2,354,145

LENS CAPPING MECHANISM

Walter O. Runcie, Lima, Peru, assignor of twenty-five per cent to Harold L. Price, Alexandria, Va.

Application August 16, 1941, Serial No. 407,192

8 Claims. (Cl. 95—53)

This invention relates to an improved lens capping mechanism.

One object of the invention is to provide a lens capping mechanism which will be operative for preventing unintentional fogging of film during manipulation of photographic cameras provided with non-capping or multi-slit focal plane shutters.

Another object of the invention is to provide, in conjunction with an improved lens capping mechanism, an improved lens capping method.

A further object of the invention is to provide mechanism of this character which may be incorporated in new cameras by the manufacturer or may be adapted to cameras already in use without the need of effecting structural changes in the conventional multi-slit focal plane shutters.

A still further object of the invention is to provide a lens capping mechanism which, when attached to a camera, will not detract in any way from the efficiency of said camera.

Still another object of the invention is to provide a lens capping mechanism which may be attached to a camera with the utmost facility.

Further objects of the invention, not specifically mentioned hereinbefore, will become apparent during the course of the following description.

In the drawing:

Figure 1 is a side elevation showing my improved lens capping mechanism as it would appear in operative position on a "speed" camera, Figure 2 is an enlarged detail perspective view showing the slide mounting plate employed, Figure 3 is an enlarged detail perspective view of the dual release slide, Figure 4 is an enlarged detail perspective view showing the plunger head retainer, and Figure 5 is an enlarged detail vertical sectional view on the line 5—5 of Figure 1 looking in the direction indicated by the arrows.

In the drawing like numerals of reference will be employed to designate like parts throughout the views, where needed.

Referring now more particularly to the drawing, the numeral 1 indicates in general a camera of conventional design. The camera 1, however, is preferably of the same type as the "Graflex" speed graphic camera. Necessarily, the camera on which my invention is mounted is provided with both focal plane and lens shutters. The camera shown is a 4 x 5 speed graphic camera. It should be understood that the invention is applicable to speed graphic cameras of all sizes and models and irrespective of the location of accessory apparatus, such as range finders and focal plane and lens shutter synchronized flash equipment, on said cameras.

The camera 1 is provided with a side wall 2, a bellows 3 and a lens assembly 4, said lens assembly being of conventional design so that further description of it is not deemed necessary.

A conventional focal plane shutter release lever 5 is mounted on the side wall 2 of the camera in the usual manner and the well-known winding keys are shown at 6 and 7.

In carrying my invention into effect, I employ a mounting plate 8 which is formed of metal or other suitable material. As best seen in Figure 2, the mounting plate consists of a bar of rectangular cross section. Formed in the upper portion of the plate 8 is a dovetail groove 9 which extends throughout the entire length of the plate and is of a depth equal to substantially half the thickness of said plate. As best seen in Figure 1, the plate 8 is mounted on the wall 2 of the camera 1 substantially medially of the width of said wall and in a longitudinal plane directly beneath the plane of the lower end edge of the plate which carries the key 6 and the conventional shutter release lever 5. The inner, or rear, end of the plate 8 is disposed beneath the lower end of said lever 5. The plate 8 is preferably mounted by passing screws or other suitable fastening devices through openings 10 at each end of said plate and in the groove 9. Formed in the groove 9 of the plate 8 and between the openings 10 is an opening 11, the purpose of which will be set forth in more detail hereinafter.

Slidably mounted in the groove 9 on the plate 8 is a dual release slide 12. The slide 12 is formed of light weight metal and includes a straight base portion 13 which is formed with beveled longitudinal edges 14 which slidably engage in the dovetail groove 9. If desired, the dovetail groove may be omitted and a groove having parallel side walls substituted in lieu thereof. The dual release slide includes an integral guide ear 15 which is disposed at the front end of the base 13 and at right angles thereto. The guide ear 15 includes an axial opening 16, and communicating between the opening 16 and the outer circumference of the ear is a V-shaped slot 17. The opening 16 is recessed at 18. Formed integrally on the opposite or rear end of the base 13 of the dual release slide 12, and projecting at right angles to said base and parallel to the ear 15 is an actuating ear 19. The actuating ear, as clearly seen in Figure 3, is formed with a laterally extending forwardly, or inwardly, curved tongue 20 which is engageable with the lower end portion of the focal plane shutter release lever 5 for permitting dual operation of both shutters.

Formed in the base 13 of the dual release slide 12, as best seen in Figure 3, is a longitudinally extending medially disposed slot 21, said slot being disposed above the opening 11 in the groove 9 of the mounting plate 8. Extending through the slot 21 and into the opening 11 is the mounting pin 22 of a plunger head retainer 23, said plunger head retainer including, in addition to the pin 22, a circular head 24 which is formed with an axial socket 25, said socket being disposed toward the ear 15 and in alinement therewith. It will now be understood that the plunger head retainer 23 serves the function of limiting longitudinal sliding movement of the dual release slide to the limits of the slot 21. Moreover, the head 24 assists in retaining the slide in slidable position. That is to say, the head 24 will retain the slide 12 in proper position for longitudinal sliding movement irrespective of whether the dovetail or rectangular form of groove 9 is employed in the construction of the mounting plate 8.

As hereinbefore pointed out, the entire device is mounted on the wall 2 by extending fastening devices through the openings 10 in the plate 8. It should be understood that, in order to insert the screws, it is necessary to move the dual release slide to its extended position, for exposing the said openings 10. As pointed out, when the device is properly installed, the tongue 20 will be disposed for engagement with the lower end of the lever 5. The ear 15 is, after the device has been installed, disposed so that it may conveniently receive the plunger head 26 of a conventional cable release 27, the opposite end 28 of said cable release being connected, in a conventional manner, with the lens assembly 4. As stated, the lens assembly includes a lens shutter of conventional design. The cable release 27 is provided with a plunger 29 which is formed with a head 30, the plunger 29 extending above and parallel with the upper surface of the base 13 of the slide 12 with said plunger head positioned in the recess 25 of the retainer 23.

As best seen in Figure 1, the device is mounted on the wall 2 in such a manner that it is offset below but is parallel with a line passing transversely through the tripping ear of the focal plane shutter release lever 5. This mounting provides ample clearance for independent operation of the release lever 5, such independent operation being necessary, as will be described hereinafter. It will be seen that the mounting of the device will position the tongue 20 of the ear 19 of the slide 12 in engagement with the tripping ear of the release lever 5. Inasmuch as the tongue 20 is curved forwardly, or inwardly, smooth engagement between the surfaces of both said tongue and the tripping ear of said lever 5 will be assured. Due to the disposition of the operative ear 19 with its low cut integral tongue 20, relative to the release lever 5, clearance is provided for uninterrupted independent operation of the lever 5, as hereinbefore stated. Such independent operation permits releasing the curtain of the focal plane shutter for bringing into operative position the larger openings to provide for slower exposures, without danger of fogging the film because, normally, the lens shutter remains closed, except when pressure is applied to operate the ear 19 for making an exposure. From the description of the installation hereinbefore set forth, it will be understood that the invention is now ready for use with the focal plane shutter release lever 5 operatively connected with the lens shutter release mechanism.

The operation of the invention will now be set forth. It is first assumed that the camera 1 is in closed position. The camera is first opened and the cable release 27 attached to the shutter 4 in the usual manner. The head 30 of the plunger 29 is then positioned in the recess 25 of the retainer 23. The plunger head is then depressed and the cable moved through the slot 17 into the opening 16 of the ear 15. The plunger head 26 will automatically position itself securely within the recess 18 and opening 16. The invention is now ready for operation. The speed lever or dial of the lens shutter is then set to "B" (bulb), and the focal plane shutter is set to whatever speed is desired. Exposures can now be made by operating the dual release slide 12, and the focal plane shutter may again be wound to any desired speed without danger of fogging the film. If desired, the cable release may remain attached to the lens shutter and folded into the camera for instant use with my invention or for operating the lens shutter in the conventional manner.

Should it be desired to make time exposures with the focal plane shutter, instead of using the lens shutter for this purpose, all that is necessary is to set the lens shutter to "T" (time) and the focal plane shutter to "T" (time). With my invention in operation, pulling on the ear 19 of the dual release slide 12 opens the shutter of the lens assembly 4 and, of course, the opening of the focal plane shutter follows immediately. Another pull on the ear 19 of the dual release slide 12 closes the lens shutter and also the focal plane shutter. The focal plane shutter may be set to "T" (time) without danger of fogging the film.

From the above description, it will be understood that the plunger 29 of the cable release is preadjusted in such a manner that, when the lens assembly 4 is set to "B" (bulb), as is necessary for making instantaneous exposures, initial pressure on the ear 19 of the dual release slide 12 opens the lens shutter, and still further pressure on said ear causes release of the curtain of the focal plane shutter, thereby completing the exposure. As soon as pressure is removed from the dual release slide 12, the lens shutter closes immediately, thereby again permitting the focal plane shutter to be rewound for the next exposure, or for changing speed, if desired.

It will be understood that fogging of the film is impossible when my invention is in use. Furthermore, fogging of the film when releasing the curtain of the focal plane shutter to position the wider slits for slower exposures, is avoided. In other words, operating the dual release slide of my invention in the ordinary manner would cause fogging of the film, because the lens shutter would open, as to make an exposure but, in view of the arrangement of my dual release slide 12, independent operation of the conventional release lever provided on the camera is possible. In releasing the curtain of the focal plane shutter, therefore, the conventional release lever is operated as the lens shutter is normally closed, being set to "B" (bulb), making film fogging impossible.

As dual operation of both the focal plane and lens shutters is essential to carry out my invention, it is to be understood that my invention is operative only on cameras provided with both types of shutter. However, all cameras of the speed graphic type are usually so equipped. Of course, extremely wide angle lens cannot usually be fitted to between-the-lens shutters, neither can some types of long focus or tele-photo lenses, in which case the focal plane shutter of the camera must be operated in the conventional manner.

It will now be understood that I have provided an improved method and means for interconnecting both the focal plane and lens shutter of the camera for dual operation.

Having thus described the invention, what is claimed as new is:

1. In combination with a camera having a focal plane release lever and lens shutter release mechanism, means for inter-connecting the focal plane shutter release lever and the lens shutter release mechanism for dual operation, said means including a dual release slide operatively connected with the shutter release lever and lens shutter releasing mechanism, and means slidably mounting the dual release slide on the camera.

2. A device of the class described as recited in claim 1 wherein means is employed for limiting movement of the dual release slide on said last-mentioned means.

3. In combination with a camera having a focal plane shutter release lever and lens shutter release mechanism, a mounting plate on a wall of the camera, a dual release slide, and means slidably connecting the dual release slide on the mounting plate, said dual release slide having a tongue engageable with the focal plane shutter release lever and having an ear engageable with a portion of the lens shutter release mechanism.

4. In combination with a camera having a focal plane shutter release lever and lens shutter release mechanism, said lens shutter release mechanism including a cable release having a plunger formed with a head, and means for interconnecting the focal plane shutter release lever and the cable release whereby dual operation of the focal plane shutter and lens shutter may be effected, said means including a mounting plate on the camera, said mounting plate having a groove, a dual release slide slidably mounted in the groove and having a base formed with a slot, said dual release slide having a guide ear at one end and said guide ear having an opening and a slot communicating with the opening, said guide ear receiving the plunger head of the cable release through said last-mentioned slot and opening, said dual release slide having an ear at its opposite end and said ear having a tongue for engagement with the focal plane shutter release lever, and a plunger head retainer mounted on the mounting plate and extending through the first-mentioned slot in the dual release slide to limit longitudinal movement of the dual release slide, said retainer having a socket removably receiving the plunger head of the cable release, said plunger head of said cable release being held by said retainer and said cable release being movable with the slide upon shifting of the focal plane shutter release lever for simultaneously operating the lens shutter release mechanism.

5. A device of the class described including a mounting plate to be mounted on a wall of a camera, a dual release slide slidably mounted on the base plate, said dual release slide having an ear for engagement with a portion of the lens shutter release mechanism and having a tongue for engagement with a focal plane shutter release lever, and means mounted on the mounting plate and engageable with the dual release slide for limiting said slide by longitudinal shifting movement, said means receiving a portion of the cable release mechanism and retaining said portion against movement.

6. A device of the class described as recited in claim 5 wherein said last-mentioned means includes a plunger head retainer, said retainer having a mounting pin and a head formed with a recess.

7. In a camera, the combination with a focal plane shutter release lever and lens shutter releasing mechanism, of lens capping mechanism including a base plate having a guide groove, and means for interconnecting the focal plane shutter release lever and lens shutter releasing mechanism for dual operation, said means including a dual release slide movably mounted in the groove of the base plate and operatively connected with the shutter release lever and lens shutter releasing mechanism.

8. In combination with a camera having a focal plane shutter release lever and lens shutter release mechanism, a mounting plate on a wall of the camera, a dual release slide, and means slidably connecting the dual release slide on the mounting plate, said dual release slide having a tongue normally abutting against the focal plane shutter release lever and having an ear engageable with a portion of the lens shutter release mechanism, the engagement of the tongue with the focal plane shutter release lever providing a one-way connection whereby the focal plane shutter release lever may be independently operated.

WALTER O. RUNCIE.